May 19, 1931.  M. H. MARTIN  1,806,075
BODY BOLSTER CENTER PLATE AND MOUNTING
Filed July 14, 1928
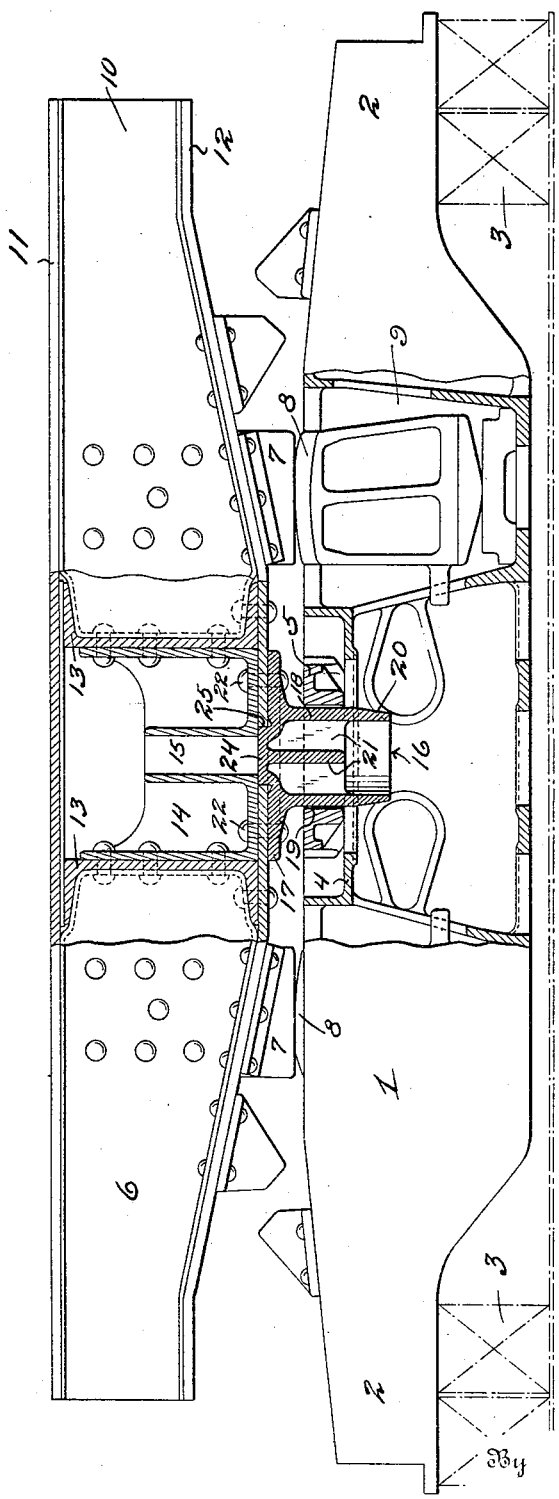
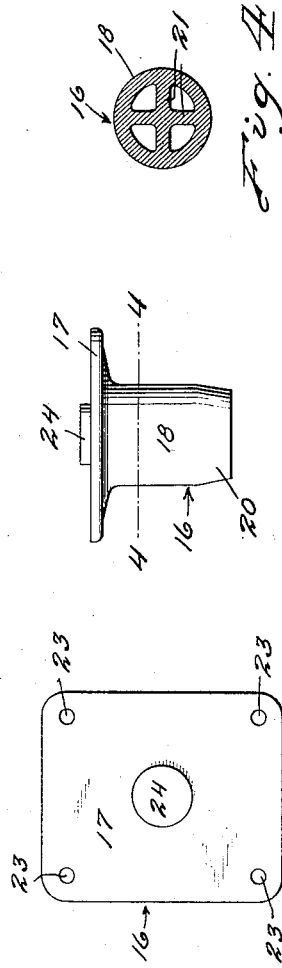
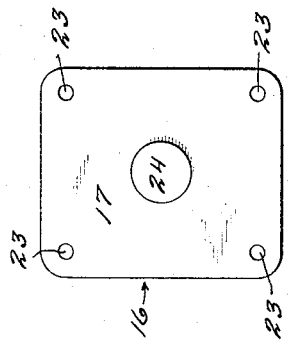
Inventor
Mark H. Martin
By Ernest S. Mechlin
Attorney Patented May 19, 1931

1,806,075

UNITED STATES PATENT OFFICE

MARK H. MARTIN, OF BALTIMORE, MARYLAND, ASSIGNOR TO T. H. SYMINGTON & SON, INC., OF BALTIMORE, MARYLAND, A CORPORATION OF MARYLAND

BODY BOLSTER CENTER PLATE AND MOUNTING

Application filed July 14, 1928. Serial No. 292,309.

The invention relates to railway equipment, particularly to the connection between the body and truck bolsters in a railway car truck, and has for its principal object the provision of a novel center plate and mounting therefor of such construction as to eliminate use of the customary king pin.

It is well known that it is the usual practice to provide a center bearing on a truck bolster within which is engaged a center plate depending from the body bolster, the actual pivotal connection generally consisting of a pivot element known ordinarily as a king pin. In some constructions of truck bolsters it is desirable to omit the king pin but when this is done it brings additional shearing strains upon the center plate carried by the body bolster. Ordinarily the center plate is secured in place upon the body bolster by a plurality of rivets which necessarily take the shearing strains. The mounting of the center plate necessitates the employment of quite a number of rivets and considerable time is consumed in the operation of inserting them and subsequently effecting upsetting thereof.

In the co-pending application of Thomas H. Symington and Percy R. Drenning filed July 18, 1930, Serial No. 468,944 lateral motion truck, and in fact in other conceivable constructions, it is desirable to omit the king pin.

It is with the above facts in view that I have devised the present invention which has for an important object the provision of a truck construction in which lateral motion of the body bolster is permissible and in which there is a novel center plate and mounting therefor so as to do away entirely with the usual king pin.

Another important object of the invention is to provide a center plate and center plate mounting in which the number of rivets necessary for securing the same in place may be greatly reduced without in any way sacrificing strength, a particular and peculiar means being provided for taking the shearing strains.

Another object of the invention is to provide a center plate and mounting therefor which may be used as a replacement part in existing equipment without necessitating the making of any changes or alterations therein other than the formation of a single opening in the bottom plate of the body bolster.

An additional object is to provide an arrangement and structure of this character which will be simple and inexpensive to make and install, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawings in which:

Figure 1 is a view taken transversely of a car truck and showing, partly in section and partly in elevation, the truck and body bolsters connected by the center plate structure constituting the invention.

Figure 2 is a top plan view of the center plate alone,

Figure 3 is a side elevation thereof, and

Figure 4 is a detail cross sectional view therethrough taken on the line 4—4 of Figure 3.

Referring more particularly to the drawings, the numeral 1 designates the truck bolster which may or may not be constructed in the precise manner shown herein and in the above identified co-pending application. However, this truck bolster has its end portions 2 adapted to rest upon truck springs indicated conventionally at 3, mounted of course within the window openings in the truck side frames, not shown. In this particular instance the truck bolster is shown as provided centrally with a depressed portion 4 upon which is mounted a casting 5 adapted to move longitudinally for permitting lateral motion of the body bolster which is indicated as a whole by the numeral 6. The body bolster is connected with the truck bolster by the special means to be described in detail constituting the present invention. Furthermore the body bolster is disclosed as equipped with depending side bearing elements 7 engaging upon rockers 8 mounted within pockets 9 in the truck bolster at opposite sides of the center thereof. All the specific details of this arrangement are disclosed in said co-pending application and as they form no part of the present invention additional mention thereof is believed to be superfluous.

A body bolster of the type shown ordinarily comprises channel bars 10 constituting the sides and upon the top and bottom flanges of which are mounted top and bottom plates 11 and 12 respectively. The center sills of the car are indicated at 13 and between them and the sides of the body bolster there is generally provided a casting 14 having an upstanding tubular portion 15 which ordinarily receives the king pin which is not shown as it is entirely unnecessary in this construction. All of the above described parts exist in the structure disclosed in said co-pending application and no claim is made thereto.

In accordance with the present invention I provide a center plate indicated as a whole by the numeral 16, this so-called center plate including a preferably rectangular attaching plate portion 17 from which depends a cylindrical portion 18 constituting a trunnion and fitting more or less loosely within an opening 19 in the slidable casting member 5. Preferably the lower end of this cylindrical or trunnion portion is tapered as indicated at 20 to facilitate assembly at it is obvious that it can therefore be more easily guided to its final position than would be the case if it were of uniform diameter throughout. Preferably the member 16 is of hollow formation, in order to reduce the weight, and may therefore be said to comprise the solid plate portion 17 and a shell which constitutes the trunnion or cylindrical portion. However, for insuring strength it is preferable that this member be formed interiorly with intersecting webs 21 as clearly indicated in the Figures 1 and 4. The member 16 is of course located between the center of the body bolster 6 and is secured in place by means of a plurality of rivets 22 which pass through suitable holes 23 in the plate portion 17 and through registering holes in the bottom plate 12 and casting member 14. Ordinarily eight of such rivets are necessary but in accordance with the present invention I have found it possible to reduce the number to four arranged as shown. I accomplish this result by forming the member 16 with an upstanding protuberance or boss 24 which rises centrally from the plate portion 17 and which is preferably cylindrical in form, this boss being received within a hole 25 in the bottom plate 12 of the body bolster. Clearly this boss or protuberance takes the shearing strains so that the rivets 22 are entirely relieved. As a consequence the only function, or at least the principal function, of the rivets is to hold the center plate 16 against the underside of the body bolster.

In use, it is of course apparent that the body bolster will have the usual swivelling movement and may also be capable of lateral motion with respect to the truck side frame, exactly as set forth in said co-pending application and as is well known in many structures of this same general type. The center plate member 16 of course is rotatable within the opening 19 and when lateral motion of the body bolster occurs the plate member 16 carries with it the casting 5 which slides within the depressed portion 4 at the center of the truck bolster. Obviously a king pin is totally unnecessary as the cylindrical portion 18 of this center plate constitutes a trunnion. Furthermore, the cylindrical or trunnion portion is of considerable diameter and is consequently well capable of withstanding all of the shocks and jars as well as the wear to which it is unavoidably subjected in service. The elimination of the king pin and the reduction of the number of rivets will of course constitute economy in construction and will, furthermore, reduce the total weight in addition to decreasing the labor involved in assembly. As the upstanding boss or protuberance 24 takes the shearing strains the reduction in the number of rivets is not objectionable inasmuch as the structure is really stronger than would otherwise be the case.

From the foregoing description and a study of the drawing it will be clear that I have thus effected a material improvement in the construction of truck and body bolster connections. The entire arrangement is extremely simple, inexpensive to assemble and install and should efficiently perform all the functions for which it is intended. It is believed that the construction, operation and advantages will be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a railway car truck structure, a body bolster, a truck bolster, and connecting means therefor comprising a member mounted for movement longitudinally of the truck bolster and restrained against movement transversely thereof, a casting secured within the body bolster at its center and a center plate member secured to the bolster and said casting and having a depending portion and rotatably engaged within said slidable member.

2. In a railway car truck structure, a body bolster, a truck bolster, and connecting means therefor comprising a slidable member mounted for movement longitudinally of the truck bolster and restrained against movement transversely thereof, and a center plate member carried by and depending from the body bolster, said center plate member including a flat attaching plate portion secured directly to the body bolster, and further including a cylindrical trunnion portion rotatably engaged within and projecting below said slidable member.

3. In a railway car truck structure, a body bolster, a truck bolster, and connecting means therefor comprising a member mounted for movement longitudinally of the truck bolster and restrained against movement transversely thereof, and a center plate member carried by and depending from the body bolster and rotatably engaged within said slidable member said center plate member including a flat attaching plate portion secured directly to the body bolster, and further including a cylindrical trunnion portion tapered at its end.

4. In a railway car truck structure, a body bolster, a truck bolster, and connecting means therefor comprising a member mounted for movement longitudinally of the truck bolster and restrained against movement transversely thereof, and a center plate member carried by and depending from the body bolster and rotatably engaged within said slidable member, said center plate member including a flat attaching plate portion secured directly to the body bolster, and further including a cylindrical trunnion portion of hollow formation provided interiorly with reinforcing webs.

5. In a railway car truck structure, a body bolster, a truck bolster, and connecting means therefor comprising a member mounted for movement longitudinally of the truck bolster and restrained against movement transversely thereof, and a center plate member carried by and depending from the body bolster and rotatably engaged within said slidable member, said center plate member including a flat attaching plate portion secured directly to the body bolster, and further including a cylindrical trunnion portion of hollow formation provided interiorly with reinforcing webs extending transversely thereof in intersecting relation.

6. In a railway car truck structure, a body bolster, a truck bolster, and connecting means therefor comprising a member mounted for movement longitudinally of the truck bolster and restrained against movement transversely thereof, and a center plate member carried by and depending from the body bolster and rotatably engaged within said slidable member, said center plate member including an attaching plate portion with a depending trunnion and having an upstanding boss, and the bottom of the bolster having a hole receiving said boss.

7. In a railway car truck including a body bolster and a truck bolster, a pivotal connection for the bolsters comprising a member carried by the truck bolster, and a center plate member having an attaching plate portion secured to the underside of the body bolster and having a central depending trunnion rotatably engaged through said member, said center plate member being provided at its top with a protuberance and the body bolster having a hole receiving said protuberance whereby the latter will take the shearing strains.

8. In a railway car truck structure including truck and body bolsters, a pivotal connection therefor comprising a member slidable on the truck bolster, and a center plate member rotatably engaging the same and carried by the body bolster, the center plate member having a plate portion riveted to the underside of the body bolster and having an upstanding projection, the body bolster being formed with a hole receiving said projection.

9. In combination, a truck bolster having a bearing member thereon, a body bolster, a casting secured within the body bolster at its center, the body bolster having a bottom plate formed with an opening, and a center plate device including an attaching portion secured to said bottom plate and said casting and having a depending trunnion rotatably engaged with said bearing member and further having a boss rising from the attaching portion and engaged within said opening.

10. In combination, a truck bolster having a bearing member thereon, a body bolster, a casting secured within the body bolster at its center, the body bolster having a bottom plate formed with an opening, and a center plate device including an attaching portion secured to said bottom plate and said casting and having a depending trunnion rotatably engaged with said bearing member and further having a boss rising from the attaching portion and engaged within said opening, said boss engaging against the underside of said casting.

11. In combination, a truck bolster, a body bolster provided centrally of its interior with a casting having a tubular sleeve portion ordinarily receiving a king pin, a bottom plate on the body bolster having a central opening of greater diameter than said tubular sleeve, a center plate device carried by the body bolster and including an attaching plate portion secured to said bottom plate and said casting, and further having a depending trunnion rotatably engaged with the truck bolster and also having an upstanding boss fitting within said opening and abutting said casting.

12. In combination, a truck bolster, a body bolster, a member mounted for movement longitudinally of the truck bolster, and a center plate member secured to and depending from the body bolster having a substantially flat attaching plate portion secured directly to the body bolster, further including a cylindrical trunnion engaged within said slidable member, and further including a portion entering within the body bolster to take the shearing strains.

13. In combination, a truck bolster having a bearing member thereon, a body bolster, a casting secured within the body bolster at its center, a bottom plate for the body bolster, a center plate device including an attaching portion and a depending trunnion rotatably engaged with said bearing member, means on the center plate device entering within said bottom plate to take the shearing strains, and securing elements common to and passing through said attaching portion, the bottom plate and said casting.

In testimony whereof I affix my signature.

MARK H. MARTIN.